US012792053B2

(12) United States Patent
Son et al.

(10) Patent No.: US 12,792,053 B2
(45) Date of Patent: Nov. 10, 2026

(54) METHOD AND APPARATUS FOR CONTROLLING FLIGHT OF UNMANNED AERIAL VEHICLE

(71) Applicant: ELECTRONICS AND TELECOMMUNICATIONS RESEARCH INSTITUTE, Daejeon (KR)

(72) Inventors: Ji Hwan Son, Daejeon (KR); Jihun Cha, Daejeon (KR); Youngsun Kwon, Daejeon (KR); Myung Seok Ki, Daejeon (KR); Suseong Kim, Daejeon (KR); Yunsu Bok, Daejeon (KR); Younghun John, Daejeon (KR); Sanghyouk Choi, Daejeon (KR); You Kyung Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 13 days.

(21) Appl. No.: 18/978,497

(22) Filed: Dec. 12, 2024

(65) Prior Publication Data

US 2026/0140506 A1 May 21, 2026

(30) Foreign Application Priority Data

Nov. 21, 2024 (KR) ........................ 10-2024-0167406

(51) Int. Cl.

*G05D 1/49* (2024.01)
*B64U 10/10* (2023.01)

(Continued)

(52) U.S. Cl.

CPC ............... *G05D 1/49* (2024.01); *B64U 10/10* (2023.01); *B64U 30/20* (2023.01); *B64U 40/10* (2023.01);

(Continued)

(58) Field of Classification Search

CPC ............ B64U 10/10; B64U 40/10; G06T 7/74
See application file for complete search history.

(56) References Cited

U.S. PATENT DOCUMENTS

2017/0068252 A1* 3/2017 Yu ........................ G05D 1/0858
2021/0362839 A1* 11/2021 Nakazawa ........... G05D 1/0816

(Continued)

FOREIGN PATENT DOCUMENTS

KR 10-2024-0116130 A 7/2024
KR 10-2024-0116131 A 7/2024

*Primary Examiner* — Imran K Mustafa

(57) ABSTRACT

A method and apparatus for controlling flight of an unmanned aerial vehicle (UAV) are provided. The method includes receiving a first desired moving direction of the UAV and determining a first desired attitude of the UAV for the UAV to fly in the first desired moving direction, generating first rotor control data of the UAV, based on the first desired attitude, controlling one or more rotors of the UAV, based on the first rotor control data, analyzing an image received from a camera while the UAV is flying based on the one or more controlled rotors, estimating an actual attitude of the UAV, based on the analyzed image, and adjusting an attitude of the UAV, based on a difference between the first desired attitude and the actual attitude.

17 Claims, 7 Drawing Sheets

(51) Int. Cl.
*B64U 30/20* (2023.01)
*B64U 40/10* (2023.01)
*G05D 1/243* (2024.01)
*G05D 1/86* (2024.01)
*G05D 109/25* (2024.01)
*G05D 111/10* (2024.01)
*G06T 7/73* (2017.01)

(52) U.S. Cl.
CPC ............... *G05D 1/243* (2024.01); *G05D 1/86* (2024.01); *G06T 7/74* (2017.01); *B64U 2201/10* (2023.01); *G05D 2109/254* (2024.01); *G05D 2111/10* (2024.01)

(56) References Cited

U.S. PATENT DOCUMENTS

| | | | |
|---|---|---|---|
| 2023/0095120 | A1 | 3/2023 | Choi et al. |
| 2023/0324930 | A1 | 10/2023 | Park et al. |
| 2024/0257376 | A1 | 8/2024 | Sommerfelt |

* cited by examiner

METHOD AND APPARATUS FOR CONTROLLING FLIGHT OF UNMANNED AERIAL VEHICLE

CROSS-REFERENCE TO RELATED APPLICATION

This application claims the benefit of Korean Patent Application No. 10-2024-0167406, filed on Nov. 21, 2024, in the Korean Intellectual Property Office, the entire disclosure of which is incorporated herein by reference for all purposes.

BACKGROUND

1. Field of the Invention

One or more embodiments relate to a method and apparatus for controlling flight of an unmanned aerial vehicle (UAV).

2. Description of the Related Art

An unmanned aerial vehicle (UAV) is an aircraft that is remotely controlled or flies autonomously without a human occupant. The UAV may be a drone. The UAV may fly in different flight modes, such as manual control and automatic flight. The autonomous flight of the UAV may refer to flight of the UAV along a set path on its own without any intervention from a pilot. The autonomous flight of the UAV may be used in, for example, agriculture, delivery, disaster relief, and surveillance.

SUMMARY

In order to control an unmanned aerial vehicle (UAV) to fly in a desired moving direction, repeated direction measurements may need to be performed to ensure that the desired moving direction is consistent with an actual moving direction. Particularly, when the UAV flies autonomously over long distances, even a slight difference between the desired moving direction and the actual moving direction may result in a large error in position of the UAV.

According to an aspect, there is provided a method of controlling flight of a UAV, the method including receiving a first desired moving direction of the UAV and determining a first desired attitude of the UAV for the UAV to fly in the first desired moving direction, generating first rotor control data of the UAV, based on the first desired attitude, controlling one or more rotors of the UAV, based on the first rotor control data, analyzing an image received from a camera while the UAV is flying based on the one or more controlled rotors, estimating an actual attitude of the UAV, based on the analyzed image, and adjusting an attitude of the UAV, based on a difference between the first desired attitude and the actual attitude.

According to another aspect, there is provided an apparatus for controlling flight of a UAV, the apparatus including one or more processors and a memory configured to store instructions executable by the one or more processors, wherein the instructions, when executed by the one or more processor, may cause the apparatus to receive a first desired moving direction of the UAV and determine a first desired attitude of the UAV for the UAV to fly in the first desired moving direction, generate first rotor control data of the UAV, based on the first desired attitude, control one or more rotors of the UAV, based on the first rotor control data, analyze an image received from a camera while the UAV is flying based on the one or more controlled rotors, estimate an actual attitude of the UAV, based on the analyzed image, and adjust an attitude of the UAV, based on a difference between the first desired attitude and the actual attitude.

Additional aspects of embodiments will be set forth in part in the description which follows and, in part, will be apparent from the description, or may be learned by practice of the disclosure.

According to embodiments, even if there is a difference between a desired moving direction of a UAV and an actual moving direction of the UAV, the moving direction of the UAV may be adjusted to the desired moving direction without repeated direction measurements.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
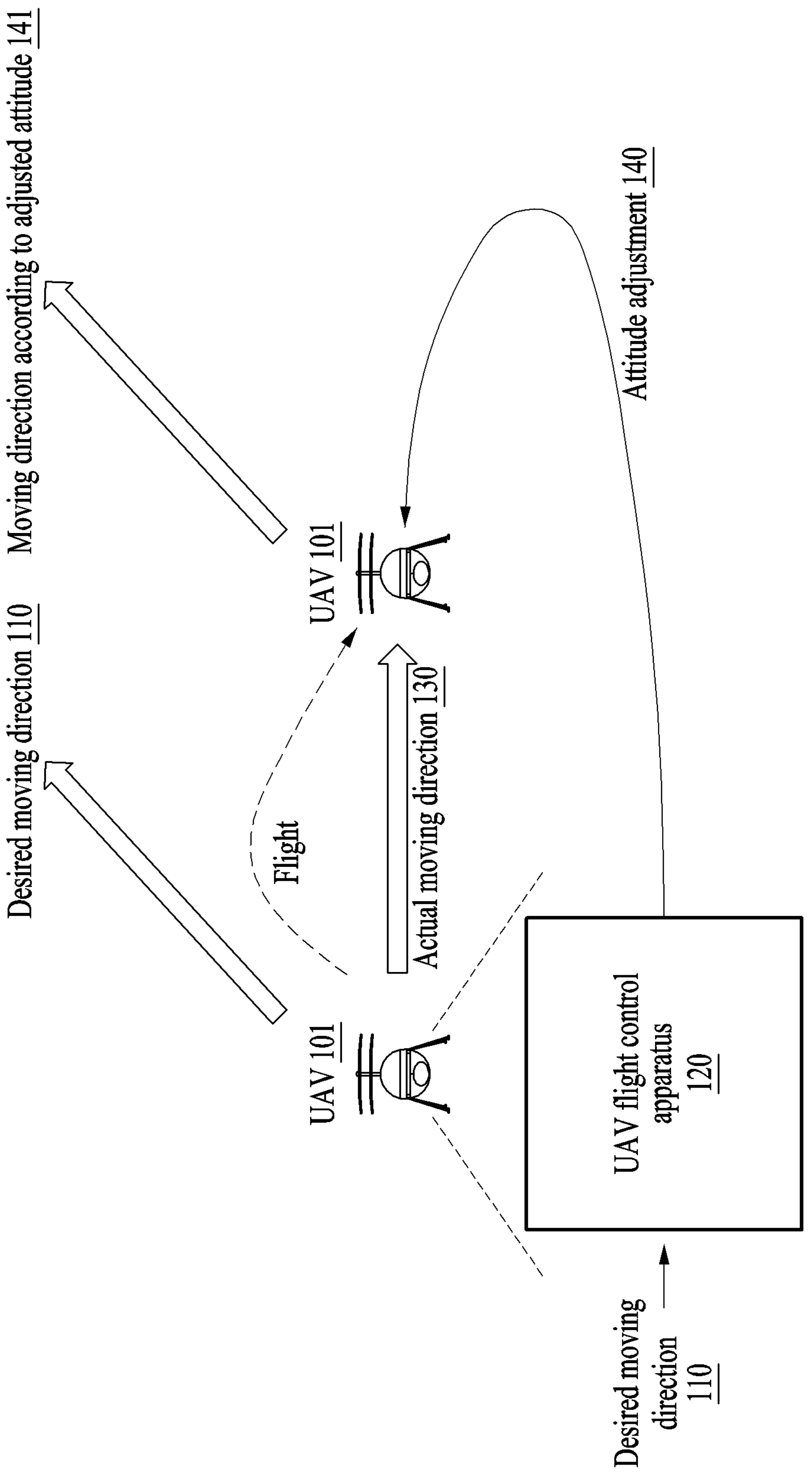
FIG. 1 is a diagram schematically illustrating an operation of an unmanned aerial vehicle (UAV) flight control apparatus for adjusting a moving direction of a UAV that does not move in a desired moving direction, according to an embodiment.

The following detailed structural or functional description is provided as an example only and various alterations and modifications may be made to the embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which the present disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a diagram schematically illustrating an operation of an unmanned aerial vehicle (UAV) flight control apparatus for adjusting a moving direction of a UAV that does not move in a desired moving direction, according to an embodiment. Referring to FIG. 1, a UAV flight control apparatus 120 of a UAV 101 may receive a desired moving direction 110. The UAV 101 may be a drone. The UAV 101 may be a coaxial drone using a coaxial rotor. The coaxial rotor may be a rotor in which two rotors rotate in opposite directions along the same rotation axis. The UAV 101 shown in FIG. 1 may be a coaxial drone, but the type of the UAV 101 is not limited thereto.

The desired moving direction 110 may be a direction in which the UAV 101 intends to move. For example, the desired moving direction 110 may be due north. The UAV flight control apparatus 120 may determine a desired attitude of the UAV 101, based on the desired moving direction 110. The desired attitude may be an attitude of the UAV 101 for flying in the desired moving direction 110. For example, the desired attitude of the UAV 101 may be an attitude tilted toward the desired moving direction 110. The attitude of the UAV 101 may include attitudes (e.g., roll, pitch, and yaw) of six degrees of freedom (6DoF). The desired attitude of the UAV 101 may be an attitude tilted in a roll and/or pitch direction toward the desired moving direction 110.

The UAV flight control apparatus 120 may generate UAV control data of the UAV 101, based on the desired attitude. The UAV control data may be data generated to control the attitude of the UAV 101 to the desired attitude. The UAV control data may include rotor control data. The rotor control data of the UAV 101 may be data generated to control a rotor of the UAV 101 so as to control the attitude of the UAV 101 to the desired attitude.

For example, when the UAV 101 is a quad rotor drone including four rotors having different rotation axes, the rotor control data of the UAV 101 may include data for controlling thrust of each rotor of the UAV 101. In addition, for example, when the UAV 101 is a coaxial drone, the rotor control data of the UAV 101 may include data for controlling a blade pitch angle of one or more rotors. The blade pitch angle may refer to an angle between a rotation plane of the rotor and blades of the rotor. The blade pitch angle may be controlled by moving a swashplate connected to the rotor. The rotor control data may include data for moving the swashplate.

The UAV flight control apparatus 120 may control the attitude of the UAV 101, based on the UAV control data. The UAV flight control apparatus 120 may control the rotor of the UAV 101, based on the rotor control data. For example, a servo motor of the swashplate connected to the rotor may be controlled based on the rotor control data. The servo motor may be a motor for moving the swashplate.

An actual attitude of the UAV 101 controlled based on the UAV control data may not be the same as the desired attitude of the UAV 101. Based on the actual attitude of the UAV 101, the UAV 101 may fly in an actual moving direction 130. The actual moving direction 130 may not be the same as the desired moving direction 110.

Some of the data required to control the attitude of the UAV 101 to the desired attitude may not be reflected in the UAV control data. Some of the data that is not reflected among the data required to control the attitude of the UAV 101 to the desired attitude may include, for example, data corresponding to gyroscopic precession that occurs based on the control of the blade pitch angle of the rotor of the UAV 101 or data corresponding to aerodynamics such as air resistance. A difference between the desired attitude of the UAV 101 and the actual attitude of the UAV 101 may include a difference corresponding to the gyroscopic precession. The gyroscopic precession phenomenon is described in more detail with reference to FIG. 2.

Figure 2:
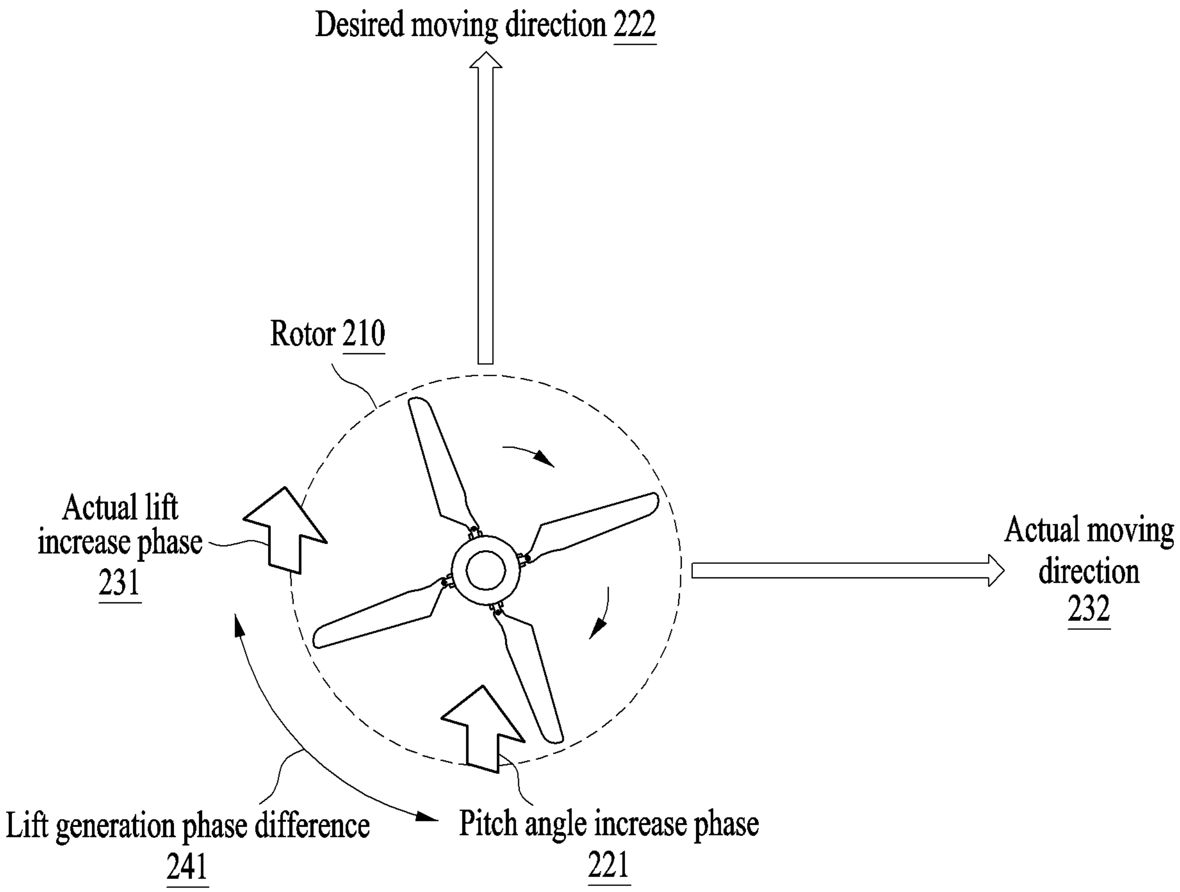
FIG. 2 is a diagram illustrating a difference between a desired moving direction of a UAV and an actual moving direction of the UAV caused by a gyroscopic precession phenomenon, according to an embodiment.

FIG. 2 is a diagram illustrating a difference between a desired moving direction of a UAV and an actual moving direction of the UAV caused by a gyroscopic precession phenomenon, according to an embodiment. Referring to FIG. 2, a blade pitch angle of a rotor 210 of a UAV may be increased in a pitch angle increase phase 221. The rotor 210 may correspond to the rotor of the UAV 101 of FIG. 1. The blade pitch angle of the rotor 210 may be increased based on the rotor control data described with reference to FIG. 1.

The pitch angle increase phase 221 may be a phase determined based on the center of the rotor 210 and a phase in which the blade pitch angle increases. When lift of the pitch angle increase phase 221 of the rotor 210 increases, the UAV may fly in a desired moving direction 222. The pitch angle increase phase 221 and the desired moving direction 222 may have a phase difference of 180 degrees with respect to the center of the rotor 210. The desired moving direction 222 may correspond to the desired moving direction 110 of FIG. 1.

When the blade pitch angle of the rotor 210 of the UAV increases in the pitch angle increase phase 221, lift of an actual lift increase phase 231 of the rotor 210 may increase, instead of increasing the lift of the pitch angle increase phase 221 of the rotor 210, due to the gyroscopic precession phenomenon. The actual lift increase phase 231 may be a phase determined based on the center of the rotor 210 and a phase in which the lift actually increases. When the lift of the actual lift increase phase 231 of the rotor 210 increases, the UAV may fly in an actual moving direction 232. The actual lift increase phase 231 and the actual moving direction 232 may have a phase difference of 180 degrees with respect to the center of the rotor 210. The actual moving direction 232 may correspond to the actual moving direction 130 of FIG. 1.

A lift generation phase difference 241 may be a phase difference between the pitch angle increase phase 221 of the rotor 210 and the actual lift increase phase 231 of the rotor 210. The lift generation phase difference 241 may correspond to the gyroscopic precession phenomenon. The gyroscopic precession may theoretically generate a phase difference of 90 degrees. However, in an actual design of the rotor 210, the rotor 210 may not be designed with perfect symmetry due to various design elements included in the rotor 210 and thus, the gyroscopic precession may not generate a phase difference of exactly 90 degrees. The lift generation phase difference 241 may not correspond to 90 degrees.

Referring again to FIG. 1, some of the data required to control the attitude of the UAV 101 to the desired attitude may not be accurately reflected in the UAV control data. For example, even if theoretical data of the gyroscopic precession phenomenon is reflected in the UAV control data, the actual gyroscopic precession of the UAV 101 may not correspond to exactly 90 degrees. When some of the data required to control the attitude of the UAV 101 to the desired attitude is not accurately reflected in the UAV control data, typically, repeated design changes or precise measurements of required data may be required to reduce the difference between the desired attitude of the UAV 101 and the actual attitude of the UAV 101.

The UAV flight control apparatus 120 may perform attitude adjustment 140 of the UAV 101, based on the difference between the desired attitude of the UAV 101 and the actual attitude of the UAV 101, without repeated design changes or precise measurements. According to the attitude adjustment 140, the UAV 101 may fly in a moving direction according to an adjusted attitude 141. The moving direction according to the adjusted attitude 141 may be the same as the desired moving direction 110.

The UAV flight control apparatus 120 may estimate the actual attitude of the UAV 101 flying in the actual moving direction 130 to determine the difference between the desired attitude of the UAV 101 and the actual attitude of the UAV 101. A method of estimating the actual attitude of the UAV 101 is described in more detail with reference to FIG. 3.

Figure 3:
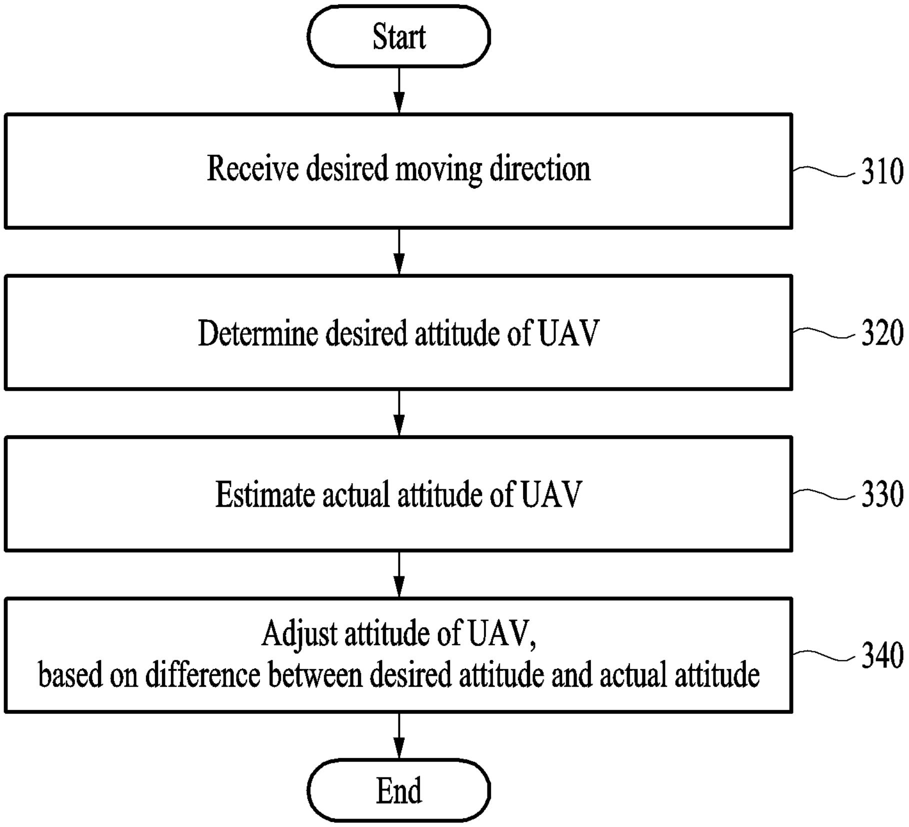
FIG. 3 is a flowchart illustrating an operation of adjusting an attitude of a UAV by comparing a desired attitude of the UAV determined based on a desired moving direction to an actual attitude of the UAV, according to an embodiment.

FIG. 3 is a flowchart illustrating an operation of adjusting an attitude of a UAV by comparing a desired attitude of the UAV determined based on a desired moving direction to an actual attitude of the UAV, according to an embodiment. Referring to FIG. 3, in operation 310, a desired moving direction may be received. The desired moving direction may be a direction in which a UAV intends to move. The desired moving direction may correspond to the desired moving direction 110 of FIG. 1.

In operation 320, a desired attitude of the UAV may be determined. The desired attitude of the UAV may be determined based on the desired moving direction determined in operation 310. The desired attitude may correspond to the second desired attitude described with reference to FIG. 1. An attitude of the UAV may be controlled based on the desired attitude. The UAV may fly in the controlled attitude based on the desired attitude.

In operation 330, an actual attitude of the UAV may be estimated. A camera may be attached to the UAV. The actual attitude of the UAV may be estimated based on an image received from the camera of the UAV. The image received from the camera of the UAV may include a plurality of image frames. To estimate the actual attitude of the UAV, the image received from the camera attached to the UAV may be analyzed. For example, feature point extraction may be performed on the image received from the camera attached to the UAV. The feature point extraction may be performed using a feature point extraction algorithm (e.g., an algorithm included in SURF and SHIFT of open source computer vision library (OpenCV)).

The image received from the camera attached to the UAV may be analyzed and 6DoF of the UAV may be estimated. Although the actual attitude of the UAV may be estimated immediately based on the analyzed image, an actual moving direction of the UAV may be estimated first based on the analyzed image. The actual attitude of the UAV may be estimated based on the actual moving direction of the UAV.

The UAV may include one or more inertial sensors. An inertial sensor may be a sensor that measures at least one of velocity, direction, gravity, and acceleration. For example, the one or more inertial sensors may include an attitude heading reference system (AHRS) and/or an inertial measurement unit (IMU). The actual attitude of the UAV may be estimated based on attitude information of the UAV received through the inertial sensor of the UAV.

To estimate the actual attitude of the UAV, changes in the attitude information of the UAV, received through the one or more inertial sensors, may be calculated. The attitude information of the UAV may be information about the attitude of the UAV. For example, the attitude information of the UAV may include information about roll, pitch, and yaw among 6DoF of the UAV. The actual attitude of the UAV may be estimated based on the analyzed image and the changes in the attitude information.

In operation 340, the attitude of the UAV may be adjusted based on a difference between the desired attitude and the actual attitude. To adjust the attitude of the UAV, an attitude error may be determined based on the desired attitude of the UAV and the actual attitude of the UAV. The attitude error may correspond to the difference between the desired attitude of the UAV and the actual attitude of the UAV. For example, the attitude error may include errors in roll and pitch of 6DoF. By re-controlling the UAV by the amount of the attitude error, the attitude of the UAV may be adjusted to the desired attitude.

Instead of immediately re-controlling the UAV, the UAV control data described with reference to FIG. 1 may be compensated for the attitude error. As the UAV control data is compensated, new UAV control data may be generated. By controlling the UAV based on the new UAV control data, the attitude of the UAV may be adjusted to the desired attitude. For example, when the attitude error corresponds to a 90 degree rotation in the yaw direction of 6DoF due to the gyroscopic precession, the UAV control data may be compensated so that the pitch angle increase phase 221 of FIG. 2 is adjusted by 90 degrees.

In addition, although not shown in FIG. 3, after the attitude of the UAV is adjusted in operation 340, a second desired moving direction may be received. A second desired attitude may be determined based on the second desired moving direction. The UAV may fly in a controlled attitude based on the second desired attitude. The UAV may be controlled based on the attitude error determined in operation 340 and the second desired attitude. When the UAV is controlled based on the second desired attitude, the attitude error determined in operation 340 may be reflected in advance to be compensated. In other words, when the UAV control data is generated based on the second desired attitude, the attitude error determined in operation 340 may be reflected in advance.

Figure 4:
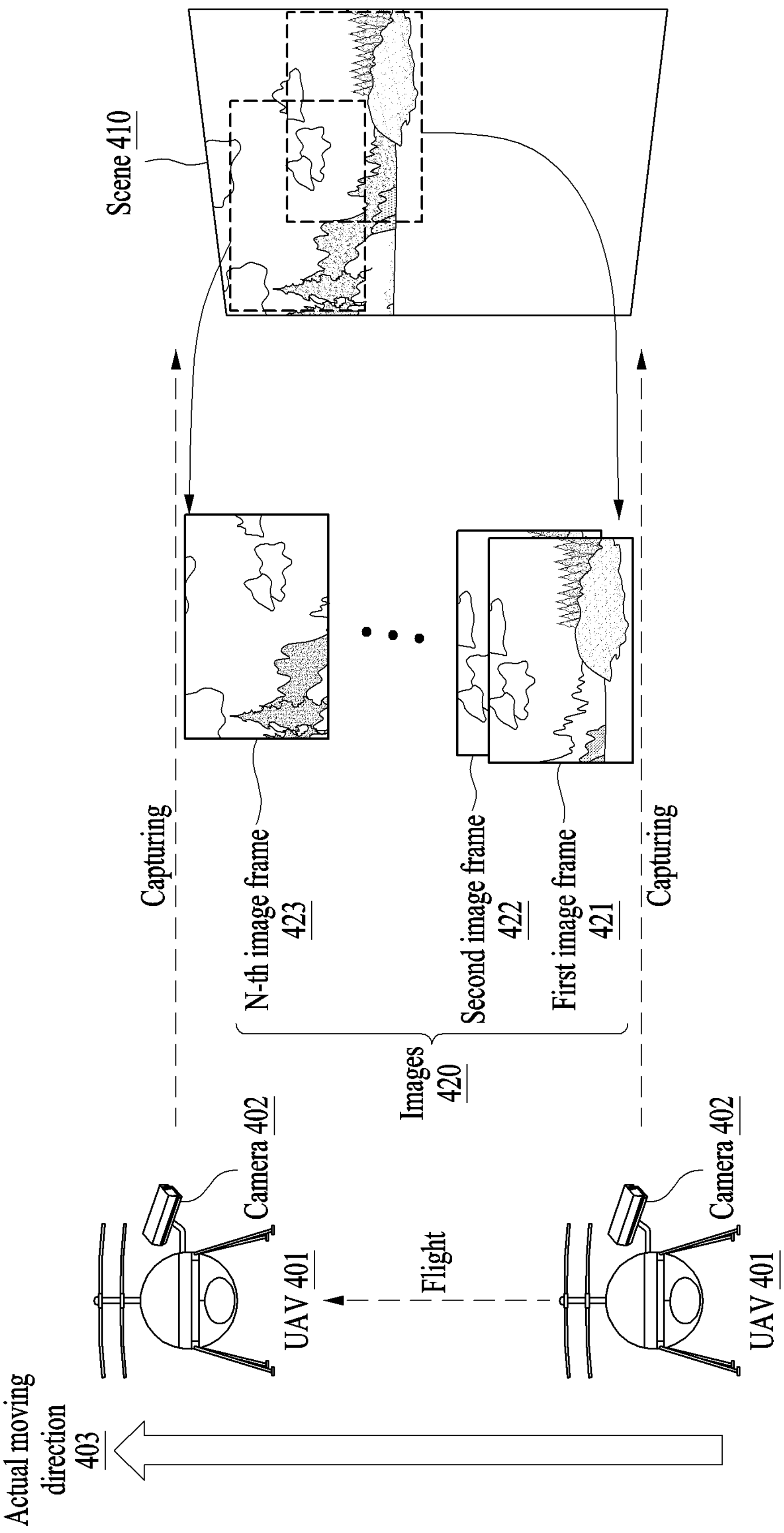
FIG. 4 is a diagram illustrating an example of an image analysis process of estimating an actual attitude of a UAV, according to an embodiment.

FIG. 4 is a diagram illustrating an example of an image analysis process of estimating an actual attitude of a UAV, according to an embodiment. Referring to FIG. 4, while a UAV 401 flies in an actual moving direction 403, a camera 402 of the UAV 401 may capture a scene 410. The UAV 401 may correspond to the UAV 101 of FIG. 1. The actual moving direction 403 may correspond to the actual moving direction 130 of FIG. 1.

The camera 402 may capture the scene 410 and may generate images 420. The images 420 may include a plurality of image frames. A first image frame 421 may correspond to the first image frame of the images 420. A second image frame 422 may be an image frame captured after the first image frame 421. An n-th image frame 423 may correspond to the last image frame received from the camera 402 at the time of analyzing the images 420.

To analyze the images 420, changes in feature points may be tracked in the first image frame 421 to the n-th image frame 423. In order to track changes in feature points in the first image frame 421 to the n-th image frame 423, feature point extraction may be performed on the first image frame 421 to the n-th image frame 423. Feature point matching may be performed between extracted feature points. The feature point matching may refer to matching similar feature points.

To track changes in the feature points, the feature point matching may be performed between feature points extracted from the first image frame 421 and feature points extracted from the second image frame 422. In addition, the feature point matching may be performed between feature points extracted from an (n-1)-th image frame and feature points extracted from the n-th image frame. The feature point matching may be performed using a feature point matching algorithm (e.g., an algorithm included in SURF and SHIFT of OpenCV).

By performing the feature point matching on the feature points extracted from the first image frame 421 to the n-th image frame 423, a moving direction and/or an attitude of the camera 402 that captured the images 420 may be estimated. By estimating the moving direction and/or the attitude of the camera 402, the moving direction and/or the attitude of the UAV 401 may be estimated.

Figure 5:
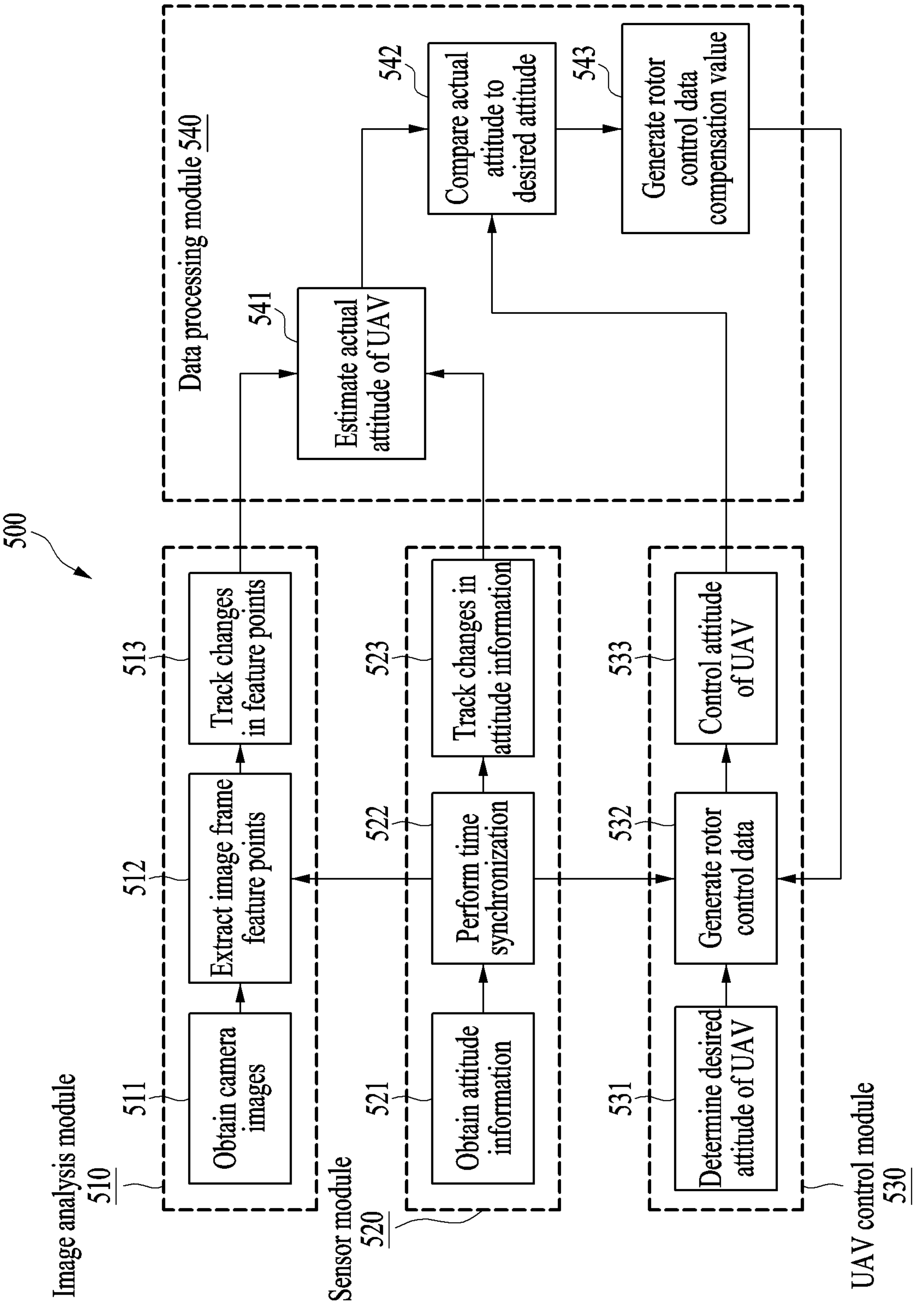
FIG. 5 is a diagram illustrating an example of a flight control process within a UAV flight control apparatus, according to an embodiment.

FIG. 5 is a diagram illustrating an example of a flight control process within a UAV flight control apparatus, according to an embodiment. Referring to FIG. 5, a UAV flight control apparatus 500 may include an image analysis module 510, a sensor module 520, a UAV control module 530, and a data processing module 540. The image analysis module 510, the sensor module 520, the UAV control module 530, and the data processing module 540 may be modules that may perform a portion of operations described with reference to FIGS. 1 to 4.

The image analysis module 510 may analyze images received from a camera of a UAV. The image analysis module 510 may obtain camera images from the camera of the UAV, in operation 511. The camera images may correspond to the images 420 of FIG. 4. The image analysis module 510 may extract image frame feature points of a plurality of image frames of the obtained camera images, in operation 512. The image analysis module 510 may track changes in feature points by matching the image frame feature points of the plurality of image frames, in operation 513.

The sensor module 520 may track changes in attitude information received through one or more inertial sensors. The one or more inertial sensors may correspond to the one or more inertial sensors described with reference to FIG. 3. The sensor module 520 may obtain the attitude information of the UAV through the one or more inertial sensors, in operation 521. The attitude information of the UAV may include information about roll and pitch of 6DoF of the UAV. The sensor module 520 may perform time synchronization with the image analysis module 510 and the UAV control module 530, for example, through a global positioning system (GPS), in operation 522. Through the time synchronization, a timestamp may be provided to the image frames from which the feature points are extracted and rotor control data for controlling the attitude of the UAV. The sensor module 520 may track changes in the attitude information, based on synchronized time, in operation 523.

The UAV control module 530 may control the attitude of the UAV. The UAV control module 530 may determine the desired attitude of the UAV, based on the received desired moving direction, in operation 531. The UAV control module 530 may generate rotor control data based on the desired attitude, in operation 532. The rotor control data may correspond to the rotor control data described with reference to FIG. 1. The UAV control module 530 may control the attitude of the UAV, based on the rotor control data, in operation 533.

The data processing module 540 may receive data from the image analysis module 510, the sensor module 520, and the UAV control module 530 and may perform data processing. The data processing module 540 may receive result data of tracking changes in the feature points in operation 513 from the image analysis module 510. The data processing module 540 may receive result data of tracking changes in the attitude information in operation 523 from the sensor module 520. The data processing module 540 may estimate an actual attitude of the UAV, based on the result data of tracking changes in the feature points and the result data of tracking changes in the attitude information, in operation 541.

The data processing module 540 may compare the estimated actual attitude to the desired attitude received from the UAV control module 530, in operation 542. The data processing module 540 may generate a rotor control data compensation value corresponding to a difference between the desired attitude and the actual attitude, in operation 543. The data processing module 540 may transmit the rotor control data compensation value to the UAV control module 530. Based on rotor control data compensated by the rotor control data compensation value, the UAV control module 530 may control the attitude of the UAV again, in operation 533. Even when a new desired moving direction is received, a previously determined rotor control data compensation value may be used when generating the rotor control data.

Figure 6:
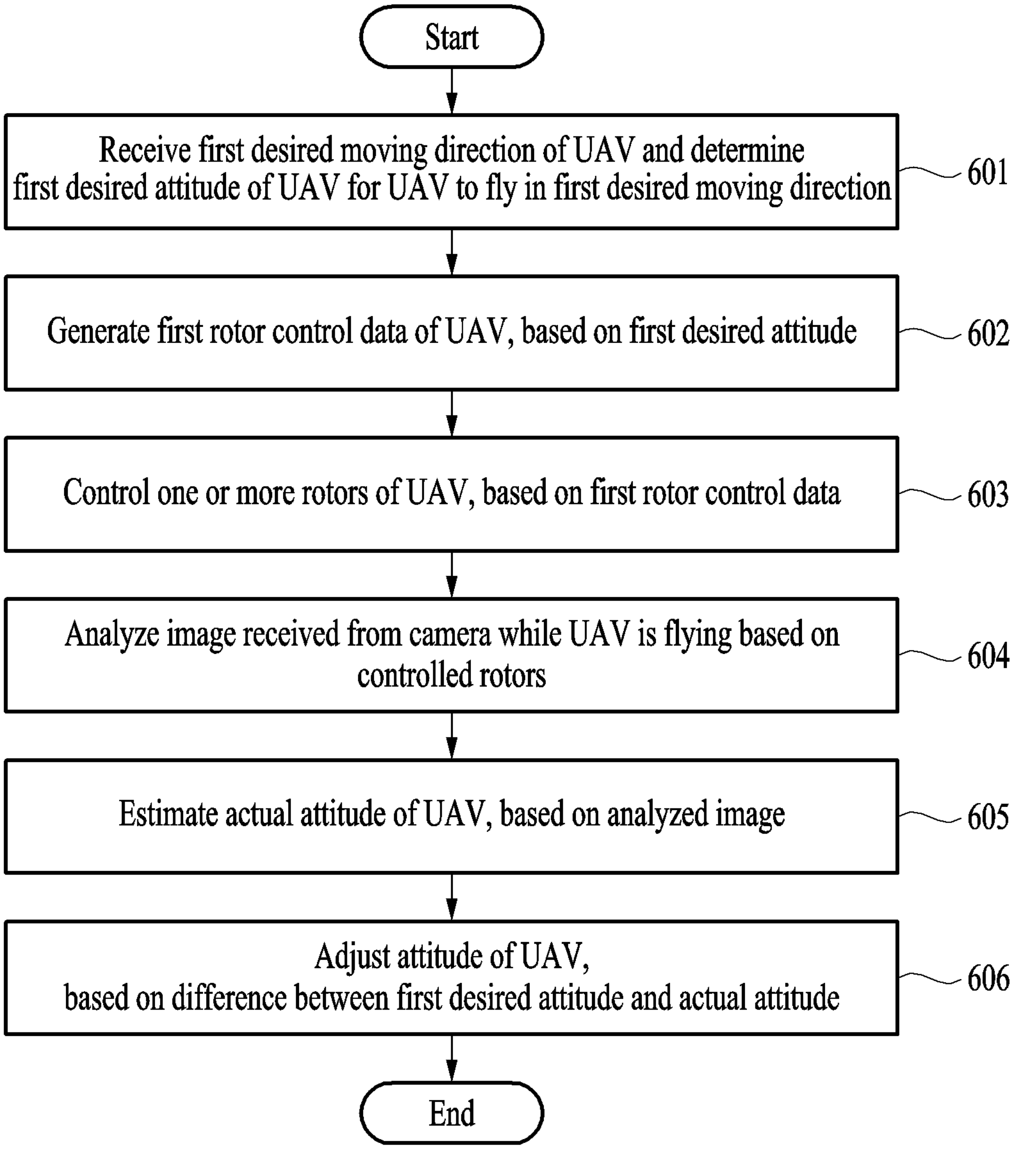
FIG. 6 is a flowchart illustrating a method of controlling flight of a UAV, according to an embodiment.

FIG. 6 is a flowchart illustrating a method of controlling flight of a UAV, according to an embodiment. Referring to FIG. 6, in operation 601, a UAV flight control apparatus may receive a first desired moving direction of the UAV and may determine a first desired attitude of the UAV for the UAV to fly in the first desired moving direction. The UAV flight control apparatus may calculate a change in attitude information of the UAV received through one or more inertial sensors while the UAV is flying. The UAV flight control apparatus may receive a second desired moving direction. The UAV flight control apparatus may determine a second desired attitude of the UAV for flying in the second desired moving direction.

In operation 602, the UAV flight control apparatus may generate first rotor control data of the UAV, based on the first desired attitude. The first rotor control data may include data for controlling a blade pitch angle of one or more rotors. The UAV flight control apparatus may generate second rotor control data of the UAV, based on the second desired attitude and the difference between the first desired attitude and an actual attitude.

In operation 603, the UAV flight control apparatus may control one or more rotors of the UAV, based on the first rotor control data. The one or more rotors may rotate along the same rotation axis.

In operation 604, the UAV flight control apparatus may analyze an image received from a camera while the UAV is flying based on the one or more controlled rotors. The UAV flight control apparatus may track a change in a feature point of a plurality of image frames of the image. The UAV flight control apparatus may perform feature point extraction on a first image frame of the image. The UAV flight control apparatus may perform feature point extraction on a second image frame. The UAV flight control apparatus may track the change in the feature point by performing feature point matching between a feature point extracted from the first image frame and a feature point extracted from the second image frame.

In operation 605, the UAV flight control apparatus may estimate an actual attitude of the UAV, based on the analyzed image. The UAV flight control apparatus may estimate an actual moving direction of the UAV, based on the analyzed image. The UAV flight control apparatus may estimate the actual attitude of the UAV, based on the actual moving direction. The UAV flight control apparatus may estimate the actual attitude of the UAV, based on the analyzed image and the calculated change in the attitude information.

In operation 606, the UAV flight control apparatus may adjust an attitude of the UAV, based on a difference between the first desired attitude and the actual attitude. The difference between the first desired attitude and the actual attitude may include a difference corresponding to gyroscopic precession that occurs based on control of the blade pitch angle. The UAV flight control apparatus may determine an attitude error based on the first desired attitude and the actual attitude. The UAV flight control apparatus may generate new rotor control data by compensating the first rotor control data based on the attitude error. The UAV flight control apparatus may adjust the attitude of the UAV by controlling the one or more rotors based on the new rotor control data. The attitude error may include errors in roll and pitch of 6DoF.

Figure 7:
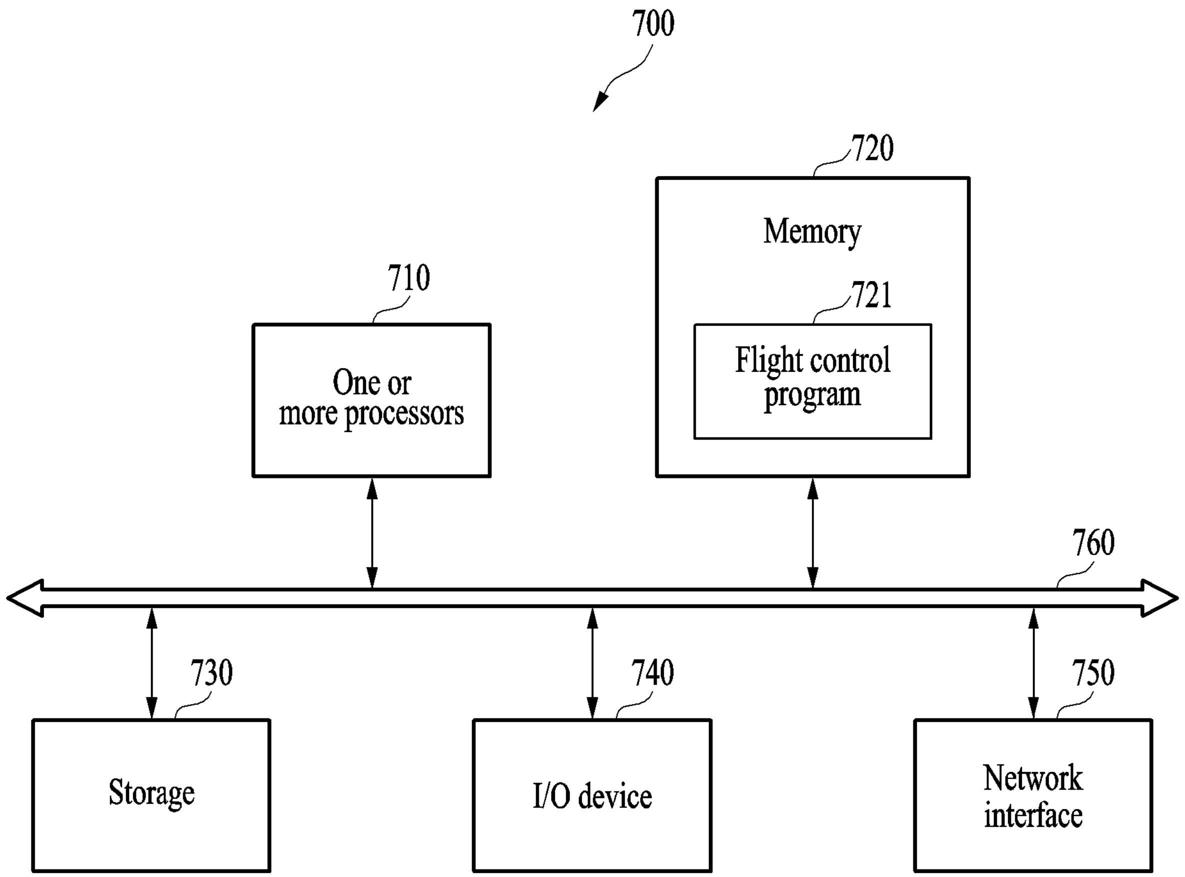
FIG. 7 is a block diagram illustrating a configuration of an electronic device for performing flight control of a UAV, according to an embodiment.

FIG. 7 is a block diagram illustrating a configuration of an electronic device for performing flight control of a UAV, according to an embodiment. Referring to FIG. 7, an electronic device 700 may include one or more processors 710, a memory 720, a storage 730, an input/output (I/O) device 740, and a network interface 750. These components may communicate with each other via a communication bus 760.

The one or more processors 710 may execute instructions stored in the memory 720 or the storage 730. When executed by the one or more processors 710, the instructions may cause the electronic device 700 to perform the operations described with reference to FIGS. 1 to 6. The memory 720 may include a non-transitory computer-readable storage medium or a non-transitory computer-readable storage device. The memory 720 may store instructions to be executed by the one or more processors 710 and may store related information while software and/or an application is being executed by the electronic device 700. The memory 720 may store a flight control program 721 that performs flight control of a UAV in an embodiment. When at least a portion of the flight control program 721 is stored in the memory 720, the operations described with reference to FIGS. 1 to 6 may be performed by the electronic device 700.

The storage 730 may include a computer-readable storage medium or a computer-readable storage device. The storage 730 may store a larger quantity of information than the memory 720 for a long time. For example, the storage 730 may include a magnetic hard disk, an optical disc, a flash memory, a floppy disk, or other non-volatile memories known in the art.

The I/O device 740 may receive an input from the user in traditional input manners through a keyboard and a mouse, and in new input manners, such as a touch input, a voice input, and an image input. For example, the I/O device 740 may include a keyboard, a mouse, a touch screen, a microphone, or any other device that detects the input from the user and transmits the detected input to the electronic device 700. The I/O device 740 may provide an output of the electronic device 700 to the user through a visual, auditory, or haptic channel. The I/O device 740 may include, for example, a display, a touch screen, a speaker, a vibration generator, or any other device that provides the output to the user. The network interface 750 may communicate with an external device through a wired or wireless network.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is singular; however, one of ordinary skill in the art will appreciate that a processing device may include a plurality of processing elements and a plurality of types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software may also be distributed over network-coupled computer systems so that the software is stored and executed in a distributed fashion. The software and data may be stored in a non-transitory computer-readable recording medium.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) discs and digital video discs (DVDs); magneto-optical media such as optical discs; and hardware devices that are specifically configured to store and perform program instructions, such as read-only memory (ROM), random access memory (RAM), flash memory, and the like. Examples of program instructions include both machine code, such as one produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

What is claimed is:

1. A method of controlling flight of an unmanned aerial vehicle (UAV), the method comprising:

receiving a first desired moving direction of the UAV and determining a first desired attitude of the UAV for the UAV to fly in the first desired moving direction;

generating first rotor control data of the UAV, based on the first desired attitude, wherein the first rotor control data comprises data for controlling a blade pitch angle of one or more rotors;

controlling one or more rotors of the UAV, based on the first rotor control data;

analyzing an image received from a camera while the UAV is flying based on the one or more controlled rotors;

estimating an actual moving direction of the UAV, based on the analyzed image;

estimating an actual attitude of the UAV, based on the actual moving direction; and adjusting an attitude of the UAV, based on an attitude error corresponding to a difference between the first desired attitude and the actual attitude, wherein the attitude error comprises a difference corresponding to gyroscopic precession that occurs based on control of the blade pitch angle.

2. The method of claim 1, wherein the analyzing of the image comprises tracking a change in a feature point of a plurality of image frames of the image.

3. The method of claim 2, wherein the tracking of the change in the feature point of the plurality of image frames of the image comprises:

performing feature point extraction on a first image frame of the image;

performing feature point extraction on a second image frame of the image; and tracking the change in the feature point by performing feature point matching between a feature point extracted from the first image frame and a feature point extracted from the second image frame.

4. The method of claim 1, further comprising:

calculating a change in attitude information of the UAV received through one or more inertial sensors while the UAV is flying, and the estimating of the actual attitude of the UAV comprises estimating the actual attitude of the UAV, based on the analyzed image and the calculated change in the attitude information.

5. The method of claim 1, wherein the attitude error includes errors in roll and pitch of six degrees of freedom (6DoF).

6. The method of claim 1, further comprising:

receiving a second desired moving direction;

determining a second desired attitude of the UAV for flying in the second desired moving direction; and generating second rotor control data of the UAV, based on the second desired attitude and the attitude error.

7. The method of claim 1, wherein all rotors of the one or more rotors rotate along a same rotation axis.

8. A non-transitory computer-readable storage medium storing instructions that, when executed by a processor, cause the processor to perform the method of claim 1.

9. The method of claim 5, wherein the adjusting of the attitude of the UAV by controlling the one or more rotors based on the second rotor control data comprises:

determining lift generation phase difference between a pitch angle increase phase of the blade pitch angle corresponding to the first rotor control data and actual lift increase phase of the blade pitch angle of the one or more rotors corresponding to the actual moving direction; and adjusting the attitude of the UAV to the desired attitude by controlling a pitch angle increase phase of the blade pitch angle of the one or more rotors to be adjusted by the lift generation phase difference based on the new rotor control data.

10. An apparatus for controlling flight of an unmanned aerial vehicle (UAV), the apparatus comprising:

one or more processors; and a memory configured to store instructions executable by the one or more processors, wherein the instructions, when executed by the one or more processors, cause the apparatus to:

receive a first desired moving direction of the UAV and determine a first desired attitude of the UAV for the UAV to fly in the first desired moving direction;

generate first rotor control data of the UAV, based on the first desired attitude wherein the first rotor control data comprises data for controlling a blade pitch angle of one or more rotors;

control one or more rotors of the UAV, based on the first rotor control data;

analyze an image received from a camera while the UAV is flying based on the one or more controlled rotors;

estimate an actual actual moving direction of the UAV, based on the analyzed image;

estimate an actual attitude of the UAV, based on the actual moving direction; and adjust an attitude of the UAV, based on an attitude error corresponding to a difference between the first desired attitude and the actual attitude, wherein the attitude error comprises a difference corresponding to gyroscopic precession that occurs based on control of the blade pitch angle.

11. The apparatus of claim 10, wherein, in order to analyze the image, the instructions, when executed by the one or more processors, cause the apparatus to track a change in a feature point of a plurality of image frames of the image.

12. The apparatus of claim 11, wherein, in order to track the change in the feature point of the plurality of image frames of the image, the instructions, when executed by the one or more processors, cause the apparatus to:

extract a first feature point from a first image frame of the image;

extract a second feature point from a second image frame of the image; and track the change in the feature point by matching the first feature point to the second feature point.

13. The apparatus of claim 10, wherein the instructions, when executed by the one or more processors, cause the apparatus to:

calculate a change in attitude information of the UAV, received through one or more inertial sensors, while the UAV is flying; and in order to estimate the actual attitude of the UAV, estimate the actual attitude of the UAV, based on the analyzed image and the calculated change in the attitude information.

14. The apparatus of claim 10, wherein, in order to adjust the attitude of the UAV, the instructions, when executed by the one or more processors, cause the apparatus to:

generate new rotor control data by compensating the first rotor control data based on the attitude error; and adjust the attitude of the UAV by controlling the one or more rotors based on the new rotor control data.

15. The apparatus of claim 10, wherein the instructions, when executed by the one or more processors, cause the apparatus to:

receive a second desired moving direction;

determine a second desired attitude of the UAV for flying in the second desired moving direction; and generate second rotor control data of the UAV, based on the second desired attitude and the difference between the first desired attitude and the actual attitude.

16. The apparatus of claim 10, wherein all rotors of the one or more rotors rotate along a same rotation axis.

17. The apparatus of claim 10, wherein, in order to adjust the attitude of the UAV by controlling the one or more rotors based on the new rotor control data, the instructions, when executed by the one or more processors, cause the apparatus to:

determine lift generation phase difference between a pitch angle increase phase of the blade pitch angle corresponding to the first rotor control data and actual lift increase phase of the blade pitch angle of the one or more rotors corresponding to the actual moving direction; and adjust the attitude of the of the UAV to the desired attitude by controlling a pitch angle increase phase of the blade pitch angle of the one or more rotors to be adjusted by the lift generation phase difference based on the second rotor control data.

* * * * *